United States Patent
Du et al.

(10) Patent No.: US 11,109,224 B2
(45) Date of Patent: Aug. 31, 2021

(54) METHOD FOR DETERMINING ACCESS METHOD OF MOBILE TERMINAL, STORAGE MEDIUM, AND MOBILE TERMINAL

(71) Applicant: HuiZhou TCL Mobile Communication Co., Ltd., HuiZhou (CN)

(72) Inventors: Kai Du, HuiZhou (CN); Lina Yang, HuiZhou (CN); Shifeng Cao, HuiZhou (CN); Ruihua Zhang, HuiZhou (CN); Tao Li, HuiZhou (CN)

(73) Assignee: HuiZhou TCL Mobile Communication Co., Ltd., HuiZhou (CN)

(*) Notice: Subject to any disclaimer, the term of this patent is extended or adjusted under 35 U.S.C. 154(b) by 31 days.

(21) Appl. No.: 16/628,036

(22) PCT Filed: Jul. 13, 2018

(86) PCT No.: PCT/CN2018/095616
§ 371 (c)(1),
(2) Date: Jan. 2, 2020

(87) PCT Pub. No.: WO2019/011324
PCT Pub. Date: Jan. 17, 2019

(65) Prior Publication Data
US 2020/0221288 A1    Jul. 9, 2020

(30) Foreign Application Priority Data
Jul. 14, 2017 (CN) .......................... 201710575497.3

(51) Int. Cl.
H04W 8/24     (2009.01)
H04W 76/11    (2018.01)
(Continued)

(52) U.S. Cl.
CPC ............. *H04W 8/24* (2013.01); *H04W 48/16* (2013.01); *H04W 48/20* (2013.01); *H04W 76/11* (2018.02)

(58) Field of Classification Search
CPC ....... H04W 8/24; H04W 76/11; H04W 48/16; H04W 48/20; H04W 48/17; H04W 8/183
See application file for complete search history.

(56) References Cited

U.S. PATENT DOCUMENTS 10,178,541 B2    1/2019  Carbone et al.
10,321,391 B2    6/2019  Russell et al.
(Continued)

FOREIGN PATENT DOCUMENTS

CN    101267631    9/2008
CN    101754187    6/2010
(Continued)

OTHER PUBLICATIONS

International Search Report and the Written Opinion dated Sep. 27, 2018 From the International Searching Authority Re. Application No. PCT/CN2018/095616 and Its Translation of Search Report Into English. (9 Pages).

*Primary Examiner* — Said M Elnoubi

(57) ABSTRACT

Disclosed are a method for determining an access method of a mobile terminal, a storage medium, and a mobile terminal. A database comprising APN types and APN access identifiers is pre-stored in a mobile terminal, such that when a SIM card is inserted into the mobile terminal, the APN type and the APN access identifier corresponding thereto can be searched in the database according to information about the SIM card, thereby determining that the access method of an operator corresponding to the SIM is VoLTE or VoWiFi, distinguishing between VoLTE and VoWiFi, reducing the probability of access failure of the mobile terminal.

16 Claims, 2 Drawing Sheets

(51) Int. Cl.
*H04W 48/16* (2009.01)
*H04W 48/20* (2009.01)

(56) References Cited

U.S. PATENT DOCUMENTS

| | | | |
|---|---|---|---|
| 10,728,816 | B2 | 7/2020 | Brown et al. |
| 2015/0282013 | A1* | 10/2015 | Kim ................. H04W 36/0022 370/331 |
| 2015/0327207 | A1 | 11/2015 | Bharadwaj |

FOREIGN PATENT DOCUMENTS

| | | | |
|---|---|---|---|
| CN | 103108380 | | 5/2013 |
| CN | 103686788 | | 3/2014 |
| CN | 104038954 | | 9/2014 |
| CN | 105791165 | | 7/2016 |
| CN | 107295503 | | 10/2017 |
| WO | WO-2016049142 A1 * | 3/2016 | ............ H04W 8/082 |
| WO | WO 2017/098324 | | 6/2017 |
| WO | WO 2017/114932 | | 7/2017 |
| WO | WO 2019/011324 | | 1/2019 |

\* cited by examiner

METHOD FOR DETERMINING ACCESS METHOD OF MOBILE TERMINAL, STORAGE MEDIUM, AND MOBILE TERMINAL

RELATED APPLICATIONS

This application is a National Phase of PCT Patent Application No. PCT/CN2018/095616 having International filing date of Jul. 13, 2018, which claims the benefit of priority of Chinese Patent Application No. 201710575497.3 filed on Jul. 14, 2017. The contents of the above applications are all incorporated by reference as if fully set forth herein in their entirety.

FIELD AND BACKGROUND OF THE INVENTION

The present invention relates to intelligent terminal technologies, and more particularly to a method for determining an access way of a mobile terminal, a storage medium, and a mobile terminal.

DESCRIPTION OF RELATED ARTS

Voice over Long Term Evolution (VoLTE) and Voice over Wireless-Fidelity (VoWiFi) are voice services based on IP Multimedia Subsystem (IMS). However, some operators distinguish between access points (e.g., APNs) of VoLTE and VoWiFi, and use two different APNs for the two services, respectively. However, according to current APN selection rules, the APNs of VoLTE and VoWiFi cannot be normally distinguished, so that terminal devices cannot determine an access way of an operator, resulting in access failure.

Therefore, the existing arts are needed to be improved.

SUMMARY OF THE INVENTION

Technical Problems

Embodiments of the present invention provide a method for determining an access way of a mobile terminal, a storage medium, and a mobile terminal, for solving the problem of access failure, caused when the existing mobile terminals cannot determine whether a corresponding access way of an operator is VoLTE or VoWiFi.

Technical Solutions

In a first aspect, an embodiment of the present invention provides a method for determining an access way of a mobile terminal, which includes:

obtaining parameter information of a subscriber identity module (SIM) card in response to inserting the SIM card into the mobile terminal;

based on the parameter information, searching a preset database for access point information corresponding to the parameter information, wherein the access point information includes an access point type and an access identifier; and in response to that the access point information is found, determining a corresponding access way of the mobile terminal based on the access point information, wherein the access way includes Voice over Long Term Evolution (VoLTE) and Voice over Wireless-Fidelity (VoWiFi).

Before obtaining the parameter information of the SIM card in response to inserting the SIM card into the mobile terminal, the method includes:

pre-storing a configuration file in the mobile terminal for the access ways, wherein the configuration file includes the parameter information of the SIM card, the access point type and the access identifier.

Before obtaining the parameter information of the SIM card in response to inserting the SIM card into the mobile terminal, the method includes:

in response to that the mobile terminal starts up, obtaining the pre-stored configuration file for the access ways and loading the configuration file into the preset database.

The method further includes:

in response to that the access point information is not found, sending a public data network (PDN) request to create a connection by using a VoLTE mode;

determining the VoLTE mode as a connection way of the mobile terminal if the connection is created; and determining a VoWiFi mode as the connection way of the mobile terminal if the connection is not created.

After determining the VoLTE mode as the connection way of the mobile terminal if the connection is created, the method further includes:

binding the access identifier and the access type that correspond to the VoLTE mode to the parameter information and storing the same in the database to update the database.

After determining the VoLTE mode as the connection way of the mobile terminal if the connection is not created, the method further includes:

binding the access identifier and the access type that correspond to the VoWiFi mode to the parameter information and storing the same in the database to update the database.

After storing in the database to update the database, the method further includes:

updating the configuration file based on the updated database.

After determining the corresponding access way of the mobile terminal based on the access point information, wherein the access way includes VoLTE and VoWiFi, the method further includes:

utilizing the access way to send a public data network (PDN) connection request for using a SIM service by the access way.

In a second aspect, an embodiment of the present invention provides a storage medium storing a plurality of instructions, which are loaded by a processor to execute the steps of:

obtaining parameter information of a subscriber identity module (SIM) card in response to inserting the SIM card into the mobile terminal;

based on the parameter information, searching a preset database for access point information corresponding to the parameter information, wherein the access point information includes an access point type and an access identifier; and in response to that the access point information is found, determining a corresponding access way of the mobile terminal based on the access point information, wherein the access way includes Voice over Long Term Evolution (VoLTE) and Voice over Wireless-Fidelity (VoWiFi).

Before obtaining the parameter information of the SIM card in response to inserting the SIM card into the mobile terminal, the method includes:

pre-storing a configuration file in the mobile terminal for the access ways, wherein the configuration file includes the parameter information of the SIM card, the access point type and the access identifier.

Before obtaining the parameter information of the SIM card in response to inserting the SIM card into the mobile terminal, the method includes:

in response to that the mobile terminal starts up, obtaining the pre-stored configuration file for the access ways and loading the configuration file into the preset database.

After searching the preset database for the access point information corresponding to the parameter information, wherein the access point information includes an access point type and an access identifier, the method further includes:

in response to that the access point information is not found, sending a public data network (PDN) request to create a connection by using a VoLTE mode;

determining the VoLTE mode as a connection way of the mobile terminal if the connection is created; and determining a VoWiFi mode as the connection way of the mobile terminal if the connection is not created.

After determining the VoLTE mode as the connection way of the mobile terminal if the connection is created, the method further includes:

binding the access identifier and the access type that correspond to the VoLTE mode to the parameter information and storing the same in the database to update the database.

After determining the VoLTE mode as the connection way of the mobile terminal if the connection is not created, the method further includes:

binding the access identifier and the access type that correspond to the VoWiFi mode to the parameter information and storing the same in the database to update the database.

In a third aspect, an embodiment of the present invention provides a mobile terminal, which includes:

a processor, for implementing instructions; and a storage device, for storing a plurality of the instructions, which are loaded by their processor to execute the steps of:

obtaining parameter information of a subscriber identity module (SIM) card in response to inserting the SIM card into the mobile terminal;

based on the parameter information, searching a preset database for access point information corresponding to the parameter information, wherein the access point information includes an access point type and an access identifier;

in response to that the access point information is found, determining a corresponding access way of the mobile terminal based on the access point information, wherein the access way includes Voice over Long Term Evolution (VoLTE) and Voice over Wireless-Fidelity (VoWiFi);

in response to that the access point information is not found, sending a public data network (PDN) request to create a connection by using a VoLTE mode;

determining the connection way of the mobile terminal based on a result of the connection;

binding the access identifier and the access type that correspond to the determined connection way to the parameter information and storing the same in the database to update the database; and sending the updated database to a vendor server corresponding to the mobile terminal such that the vendor server updates a factory-configured configuration file based on the updated database, and the updated configuration file is delivered to all the corresponding mobile terminals in a form of a package of updates, so as to update the configuration file for every mobile terminal.

Before obtaining the parameter information of the SIM card in response to inserting the SIM card into the mobile terminal, the method includes:

pre-storing a configuration file in the mobile terminal for the access ways, wherein the configuration file includes the parameter information of the SIM card, the access point type and the access identifier.

Before obtaining the parameter information of the SIM card in response to inserting the SIM card into the mobile terminal, the method includes:

in response to that the mobile terminal starts up, obtaining the pre-stored configuration file for the access ways and loading the configuration file into the preset database.

Determining the connection way of the mobile terminal based on a result of the connection includes:

determining the VoLTE mode as the connection way of the mobile terminal if the connection is created, wherein binding the access identifier and the access type that correspond to the determined connection way to the parameter information and storing the same in the database to update the database includes:

binding the access identifier and the access type that correspond to the VoLTE mode to the parameter information and storing the same in the database to update the database.

Determining the connection way of the mobile terminal based on a result of the connection includes:

determining a VoWiFi mode as the connection way of the mobile terminal if the connection is not created, wherein binding the access identifier and the access type that correspond to the determined connection way to the parameter information and storing the same in the database to update the database includes:

binding the access identifier and the access type that correspond to the VoWiFi mode to the parameter information and storing the same in the database to update the database.

After determining the corresponding access way of the mobile terminal based on the access point information, wherein the access way includes VoLTE and VoWiFi, the method further includes:

utilizing the access way to send a public data network (PDN) connection request for using a SIM service by the access way.

BENEFICIAL EFFECTS

Beneficial effects are provided below. Compared to the existing arts, the present invention provides a method for determining an access way of a mobile terminal, a storage medium, and a mobile terminal. A database including APN types and APN access identifiers is pre-stored in a mobile terminal, such that when a SIM card is inserted into the mobile terminal, the APN type and the APN access identifier can be searched in the database according to information of the SIM card, thereby determining that the access way of an operator corresponding to the SIM is VoLTE or VoWiFi, distinguishing between VoLTE and VoWiFi, reducing the probability of access failure of the mobile terminal.

DESCRIPTION OF SPECIFIC EMBODIMENTS OF THE INVENTION

The present invention provides a method for determining an access way of a mobile terminal, a storage medium, and a mobile terminal. To make the objectives, technical schemes, and effects of the present invention more clear and specific, the present invention is described in further detail below with reference to the embodiments in accompanying with the appending drawings. It should be understood that the specific embodiments described herein are merely for interpreting the present invention and the present invention is not limited thereto.

It can be understood by one of ordinary skill in the art that as used herein, the singular forms "a", "an", "said" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It should be understood that, when an element is referred to as being "connected" or "coupled" to another element, the element may be directly connected to or coupled to other elements, or there may also exist an intermediate element. In addition, the term "connect" or "couple" used herein may include wireless connection or wireless coupling. As used herein, the term "and/or" includes any and all combinations of one or more of the associated listed items.

It can be understood by one of ordinary skill in the art that unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

By descriptions of embodiments, the invention will be further illustrated with reference to the appending drawings.

Figure 1:
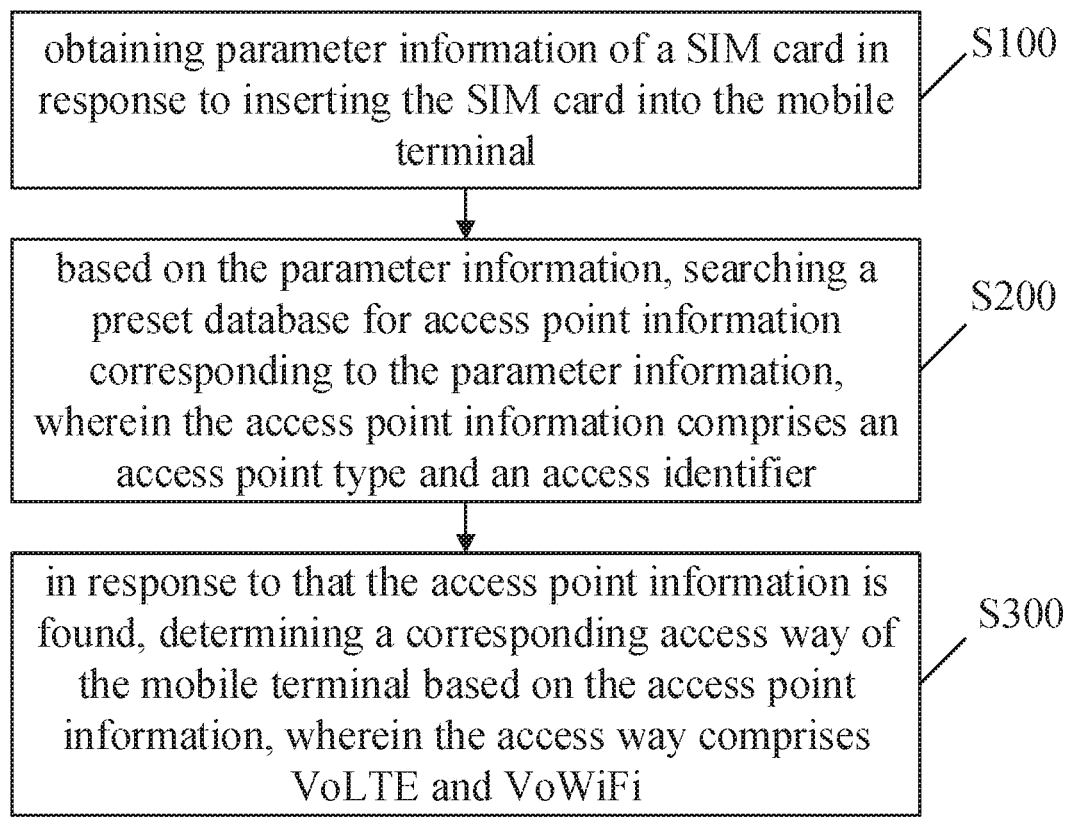
FIG. 1 is a flowchart of a method for determining an access way of a mobile terminal provided in an embodiment of the present invention.

FIG. 1 is a flowchart of a method for determining an access way of a mobile terminal provided in an embodiment of the present invention. The method includes the followings.

Step S100—obtaining parameter information of a subscriber identity module (SIM) card in response to inserting the SIM card into the mobile terminal;

Step S200—based on the parameter information, searching a preset database for access point information corresponding to the parameter information, wherein the access point information includes an access point type and an access identifier;

Step S300—in response to that the access point information is found, determining a corresponding access way of the mobile terminal based on the access point information, wherein the access way includes Voice over Long Term Evolution (VoLTE) and Voice over Wireless-Fidelity (VoWiFi).

In the present embodiment, a database including access point name (APN) types and APN access identifiers is pre-stored in a mobile terminal, such that when a SIM card is inserted into the mobile terminal, the APN type and the APN access identifier corresponding thereto can be searched in the database according to information of the SIM card, thereby determining that the access way of an operator corresponding to the SIM card is VoLTE or VoWiFi. This achieves distinguishing between VoLTE and VoWiFi, and thus the probability of access failure of the mobile terminal is reduced.

Specifically, in Step S100, the parameter information of the SIM card is a marker for distinguishing mobile phone users, which may be an international mobile subscriber identification number (IMSI). The IMSI consists of MCC, MNC and MSIN. The MCC is directed to mobile country number, consisting of 3 digits, used to uniquely identify the country to which the mobile user belongs. The MNC is directed to network id, consisting of 2 digits, used to identify the mobile network to which the mobile user belongs; for example, China Mobile is 00, China Unicom is 01 and China Telecom is 03. The MSIN is directed to mobile user identification number, consisting of 11 digits (a same length for all), used to uniquely identify mobile users in domestic GSM mobile communication network. In the present embodiment, the parameter information of the SIM card is the MCC and the MNC, which are stored in the SIM card. Accordingly, the parameter information can be read from the SIM card when the mobile terminal loads the SIM card.

In Step S200, the database is pre-stored for storing the access point information, which is obtained by loading configuration information of an operator that is presented as leaving the factory. The access point information includes access type "type", the MCC, the MNC and an access point identifier "bears". The "bears" is used to identify an access way of an operator corresponding to the SIM card. The "bears" is represented by a number of 2 digits. For example, bears="18" indicates that the APN is only applicable to VoWiFi; bears="14" indicates that the APN is only applicable to VoLTE; bears="14; 18" indicates that the APN is applicable to both of VoLTE and VoWiFi.

Further, the access point information in the database is obtained by loading a configuration file pre-stored in the mobile terminal when the mobile terminal starts up. Correspondingly, before the step of obtaining the parameter information of the SIM card in response to inserting the SIM card into the mobile terminal, the method includes the followings.

Step S10—pre-storing a configuration file in the mobile terminal for the access ways, wherein the configuration file includes the parameter information of the SIM card, the access point type and the access identifier;

Step S20—in response to that the mobile terminal starts up, obtaining the pre-stored configuration file for the access ways and loading the configuration file into the preset database.

Specifically, the configuration file is configured by the mobile terminal as leaving the factory, and is used to store configuration information of various operators. The configuration file carries the access identifier, which is used to indicate an access way of APN of a corresponding service provided by the operator. For the configuration file, the operator is illustrated with Elisa as an example. The Elisa APN configuration file includes:

VoLTE and VoWiFi APN configuration for voice communication
    <APN carrier="Elisa IMS"
    MCC="244"
    MNC="05"
    APN="IMS";
    type="IMS"
    protocol="IPV4V6"
    roaming_protocol="IPV4V6"
    bears="14;18"/>
  (2) VoLTE APN for supplementary services
    <APN carrier="Elisa XCAP"
    MCC="244"
    MNC="05"
    APN="xcap"
    type="xcap"
    protocol="IPV4V6"
    roaming_protocol="IPV4V6"
    bears="14"/>
  (3) VoWiFi APN for supplementary services
    <APN carrier="Elisa XCAP over WIFI"
    MCC="244"
    MNC="05"
    APN="xcap"
    type="xcap"
    protocol="IPV4V6"
    roaming_protocol="IPV4V6"
    bears="18"/>.

The activation of the mobile terminal refers to a first startup of the mobile terminal, which reads the configuration file and loads the configuration file into the preset database, for searching for a corresponding access type and access identifier based on the parameter information of the SIM card so as to determine the access way.

In Step S300, determining a corresponding access way of the mobile terminal based on the access point information refers to that voice access way of an operator corresponding to the SIM card is VoLTE when the access way corresponding to the access point information is VoLTE, and voice access way of an operator corresponding to the SIM card is VoWiFi when the access way corresponding to the access point information is VoWiFi. Meanwhile, the corresponding access way is used to send a public data network (PDN) request to create a connection with an operator server, register an ISM account, and use normal ISM services.

In an embodiment of the present invention, the method further includes the followings.

Step S400—in response to that the access point information is not found, sending a PDN request to create a connection by using VoLTE;

Step S500—determining VoLTE as a connection way of the mobile terminal if created;

Step S600—determining VoWiFi as a connection way of the mobile terminal if not created.

Specifically, when the access point information is not found, PDN request is sent to create the connection by using an access way with a high priority that is set in advance. The priority of VoLTE mode may be higher than that of VoWiFi mode, and the priority of VoWiFi mode may also be higher than that of VoLTE mode. In the present embodiment, the priority of VoLTE mode is higher than that of VoWiFi mode, so that the VoLTE mode is used to send the PDN request to create the connection.

Further, when the connection is created by the VoLTE mode, the VoLTE mode is determined to be a connection way of the mobile terminal, and the access identifier and access type corresponding to the VoLTE mode bind to the parameter information and then is stored in the database to update the database. When the connection is not created by using the VoLTE mode, the VoWiFi mode is determined to be a connection way of the mobile terminal, and the access identifier and access type corresponding to the VoWiFi mode bind to the parameter information and then is stored in the database to update the database. In such a way, when the SIM card corresponding to the operator is inserted next time, a corresponding access way can be quickly determined. Accordingly, an ISM account is quickly registered on the operator server to use the ISM services.

Further, the configuration file may be updated according to the updated database. In practical applications, the updated database may be sent to a vendor server corresponding to the mobile terminal. The vendor server may update the factory-configured configuration file based on the updated database. The updated configuration file may be delivered to all the corresponding mobile terminals in a form of a package of updates, so as to update the configuration file for every mobile terminal.

The present invention further provides a storage medium, which stores a plurality of instructions, suitable for being loaded by a processor to execute any of the afore-described methods for determining an access way of the mobile terminal.

Figure 2:
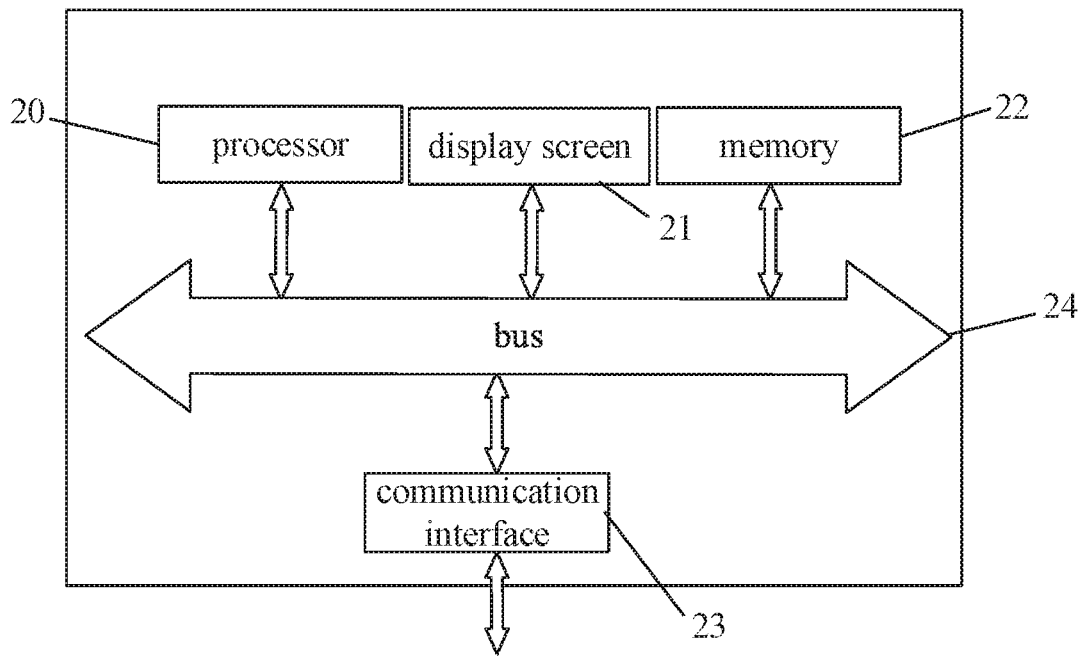
FIG. 2 is a structural diagram illustrating the principle of a mobile terminal provided in an embodiment of the present invention.

As shown in FIG. 2, the present invention further provides a mobile terminal, which includes at least one processor 20 (one processor 20 is illustrated in FIG. 2 for example); a display screen 21; and a memory 22, and may further include a communication interface 23 and a bus 24. The processor 20, the display screen 21, the storage 22 and the communication interface 23 can communicate with each other via the bus 24. The display screen 21 is provided with a default user guide interface (GUI) in a default display setting mode. The communication interface 23 can transmit messages. The processor 20 may call logical instructions in the memory 22 to execute the methods described in above embodiments.

In addition, the logical instructions in the memory 22 may be stored in a computer-readable storage medium when it is implemented in the form of a software functional unit and is sold or used as a separate product.

As a computer readable storage medium, the memory 22 can be provided for storing software programs and computer executable programs, e.g., program instructions or modules corresponding to the methods of the embodiments of the present invention. By running the software programs, instructions or modules stored in the memory 22, the processor 30 can implement functional application and data processing to carry out the methods in above embodiments.

The memory 22 may include a code area and a data area, in which the code area is for storing an operating system, at least one application needed for a function and others, and the data area is for storing data created according to the use of a terminal device. In addition, the memory 22 may include a high-speed random access memory, and may also include a nonvolatile memory, such as a medium for storing program codes, e.g., a flash memory, a portable hard disk, a read-only memory (ROM), a random access memory (RAM), a magnetic disk, and an optical disk, etc., and may be a volatile storage medium.

In addition, the processor loads the plurality of instructions in the memory and the mobile terminal and execute above methods, which have been described detailedly above and are not repeated herein.

Figure 3:
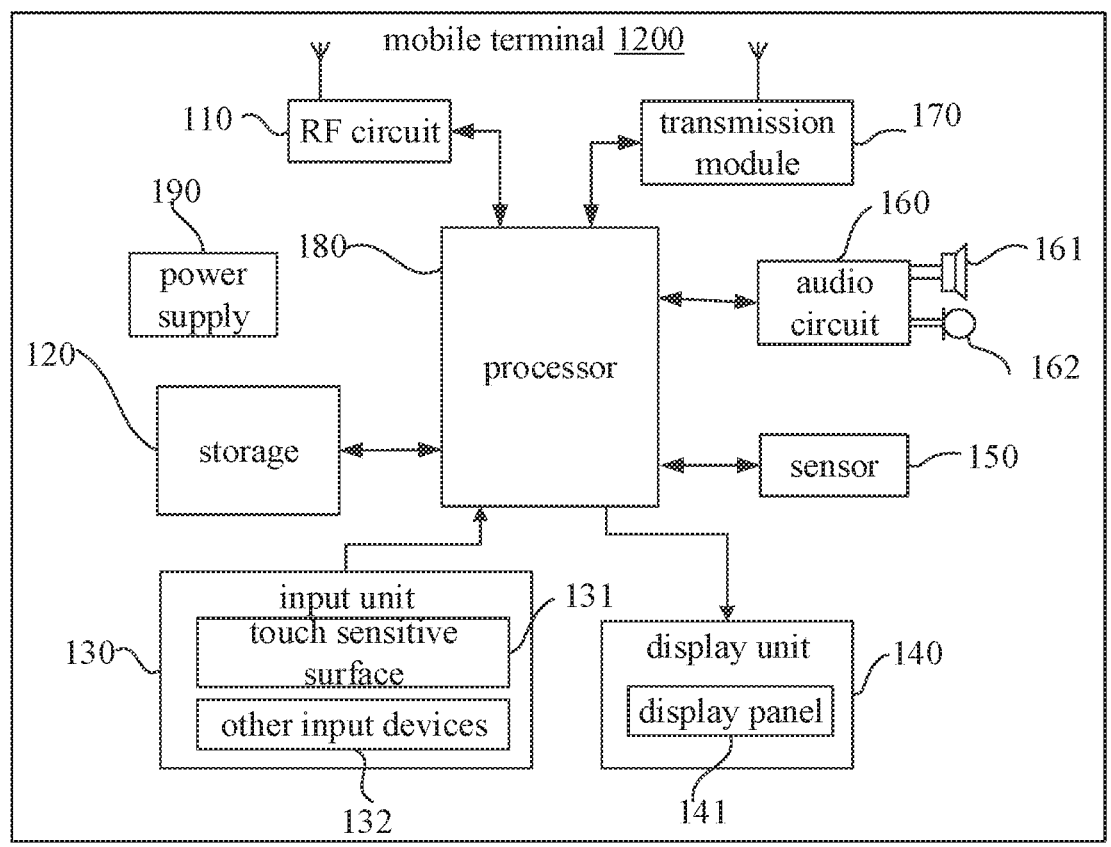
FIG. 3 is a structural schematic diagram showing a mobile terminal provided in an embodiment of the present invention.

FIG. 3 is a structural block diagram showing a mobile terminal provided in an embodiment of the present invention. The mobile terminal can be utilized to implement the method for determining an access way of a mobile terminal, a storage medium and a mobile terminal according to above embodiments. The mobile terminal 1200 can be a smartphone or a tablet computer.

As shown in FIG. 3, the mobile terminal 1200 may include a radio frequency (RF) circuit 110, a storage 120 including of one or more computer-readable storage media (a single one is merely illustrated in the drawings), an input unit 130, a display unit 140, a sensor 150, an audio circuit 160, a transmission module 170, a processor 180 including one or more processing cores (a single one is merely illustrated in the drawings), a power supply 190, and etc. A person skilled in the art understands that the structure of the mobile terminal 1200 shown in FIG. 3 does not constitute a limitation to the mobile terminal 1200, and may include more or less components than those illustrated in the drawings. Furthermore, some components of the mobile terminal 1200 can be combined and/or arranged in different ways other than that shown in FIG. 3.

The RF circuit 110 is configured to receive and transmit electromagnetic waves to implement conversion between the electromagnetic waves and electrical signals, thereby communicating with a communication network or any other device. The RF circuit 110 may include various existing circuit components for executing the functions, for example, an antenna, an RF transceiver, a digital signal processor, an encryption/decryption chip, a subscriber identity module (SIM) card, a storage, and so on. The RF circuit 110 can communicate with various networks, such as internet, an intranet, or a wireless network, or can communicate with other devices via the wireless network. The above-mentioned wireless network may include a cellular network or a wireless local area network or metropolitan area network. The above-mentioned wireless network may use any one of communication standards, protocols, or technologies, including but not limited to Global System for Mobile communications (GSM), Enhanced Data GSM Environment (EDGE), Wideband Code Division Multiple Access (WCDMA), Code Division Multiple Access (CDMA), Time Division Multiple Access (TDMA), WIFI (such as standards of the Institute of Electrical and Electronics Engineers including IEEE802.11a, IEEE802.11b, IEEE 802.11g, and/or IEEE 802.11n), Voice over Internet Protocol (VoIP), Worldwide Interoperability for Microwave Access (Wi-Max), any other protocol for mails, instant communication, and short messages, any other suitable communication protocol, or any other protocol which has not been developed.

The storage 120 can be configured to store software programs and modules, such as the program instructions/modules corresponding to the method and system for quick selection by the mobile terminal in above-mentioned embodiments. The processor 180 can perform various applications of functions and data processing by executing the software programs and modules stored in the storage 120 to implement the quick selection function for the mobile terminal. The storage 120 may include high-speed random access memory, and may further include non-volatile memory such as one or more disk storage devices, a flash memory, or other non-volatile solid-state storage. In some embodiments, the storage 120 also includes a remote storage disposed corresponding to the processor 180. The remote storage may be linked to the mobile terminal 1200 via a network. The network may include but not limited to at least one combination of internet, an intranet, a local area network, and a mobile communication network.

The input unit 130 can be configured to receive input numbers or character information, and generate signal input of a keyboard, a mouse, a joystick, or an optical trackball in relation to user settings and functional control. Specifically, the input unit 130 may include a touch sensitive surface 131 and any other input device 132. The touch sensitive surface 131, which is also called a touch screen or a touchpad, can gather a touch operation (for example, operations by use of a finger of a user, a stylus, and any other suitable object or attachment on or near the sensitive surface 131) applied on or near to the touch sensitive surface 131 by the user and drive a connected device according to preset programs. Optionally, the touch sensitive surface 131 may include a touch-sensitive device and a touch controller. The touch-sensitive device detects a direction of the user's touch, detects signals resulted from the touch operation, and transmits the signals to the touch controller. The touch controller receives information of the touch from the touch-sensitive device, converts it into a touch coordinate, further transmits the coordinate to the processor 180, and further receives and executes an instruction from the processor 180. Furthermore, the touch sensitive surface 131 may be implemented by utilizing capacitive, resistive, infrared, and surface acoustic wave technologies. In addition to the touch sensitive surface 131, the input unit 130 may further include any other input device 132. Specifically, the input device may include but not limited to one or any of the combination of a physical keyboard, function keys (such as volume control keys, switch keys, etc.), a trackball, a mouse, and a joystick.

The display unit 140 may be configured to display information inputted by the user, information provided for the user, or various types of graphical user interfaces of the mobile terminal 1200. The graphical user interfaces may include a graph, a text, an icon, a video, and any combination of them. The display unit 140 may include a display panel 141, optionally, which may be a liquid crystal display (LCD) or an Organic Light-Emitting Diode (OLED) display. Furthermore, the touch sensitive surface 131 may cover the display panel 141. When the touch sensitive surface 131 detects a touch operation on or near the touch sensitive surface 131 and transmits a corresponding signal to the processor 180 to determine a type of the touch event, the processor 180 controls the display panel 141 to provide appropriate visual output according to the type of the touch event. Although the touch sensitive surface 131 and the display panel 141 in FIG. 3 are two separate components for implementing input and output functions, the touch sensitive surface 131 and the display panel 141 may be integrated into one component for implementing the input and output functions in some embodiments.

The mobile terminal 1200 may further include at least one sensor 150, such as a light sensor, a motion sensor, and other sensors. Specifically, the light sensor can include an ambient light sensor and a proximity sensor. The ambient light sensor can adjust the brightness of the display panel 141 according to bright or dark as to the ambient light. The proximity sensor can turn off the display panel 141 and/or the backlight when the mobile terminal 1200 is moved close to ears. As one type of the motion sensor, a gravity sensor (G-sensor) can detect acceleration speed on all directions (generally up to three axis), can detect magnitude and direction of the gravity when it stays still, and can identify a gesture in a cell phone application (such as a screen switch between landscape style and portrait style, relevant games, and magnetometer calibration) and recognize vibration patterns to identify relevant functions (such as pedometer, and knock), and so on. Additionally, a gyroscope, a barometer, a hygrometer, a thermometer, an infrared sensor, and any other sensor can be deployed in the mobile terminal 1200, and the details for these are not repeated herein.

The audio circuit 160, a speaker 161, and a microphone 162 provide an audio interface between the user and the mobile terminal 1200. The audio circuit 160 converts received audio data to an electrical signal and transmits the electrical signal to the speaker 161. The speaker 161 converts the electrical signal to sound signals and outputs the sound signals. In addition, the microphone 162 converts collected sound signal to an electrical signal. The audio circuit 160 converts the electrical signal to audio data and transmits the audio data to the processor 180 for further processing. After the processing, the audio data may be transmitted to another terminal via the RF circuit 110, or transmitted to the storage 120 for further processing. The audio circuit 160 may further include an earphone jack for providing communication between an external earphone and the mobile terminal 1200.

The mobile terminal 1200 can be configured to, by the transmission module 170 (such as a WIFI module), send and receive emails, browse a webpage, and access to streaming media, and so on. It provides the user with wireless broadband internet access. It should be understood that although the transmission module 170 is illustrated in FIG. 3, this module is not an essential component for the mobile terminal 1200 and can be omitted according to needs without departing from the scope of the present invention.

The processor 180 functions as a control center of the mobile terminal 1200 and is configured to connect each component of the cell phone using various interfaces and circuits, and is configured to execute the various functions of the mobile terminal 1200 and to perform data processing by running or executing the software programs and/or modules stored in the storage 120 and calling the data stored in the storage 120, thereby monitoring the overall mobile terminal 1200. Optionally, the processor 180 can include one or more processing cores. In some embodiments, an application processor and a modulation/demodulation processor can be integrated to form the processor 180. The application processor is primarily configured to process an operating system, user interfaces, application programs, and so on. The modulation/demodulation processor is primarily configured to process wireless communication. It should be understood that the modulation/demodulation processor can be independent from the processor 180.

The mobile terminal 1200 further includes the power supply 190 configured to provide power for the various components of the mobile terminal 1200. In some embodiments, the power supply can be logically coupled to the processor 180 via a power management system that controls charging, discharging, power consumption, and so on. The power supply 190 may further include one or more direct current (DC)/or alternating current (AC) power sources, recharging system, power failure detection circuit, power converter or inverter, power supply status indicator, and the like.

Although not being shown, the mobile terminal 1200 may include a camera (such as a front camera and a rear camera), a BLUETOOTH module, and so on. They are not repeated herein. In the present embodiment, a display unit of the mobile terminal is a display with a touch screen. The mobile terminal further includes a storage and one or more programs. The one or more programs are stored in the storage. After configuration, one or more processors execute the one or more programs, which include the following operating instructions:

obtaining parameter information of a subscriber identity module (SIM) card in response to inserting the SIM card into the mobile terminal;

based on the parameter information, searching a preset database for access point information corresponding to the parameter information, wherein the access point information includes an access point type and an access identifier;

in response to that the access point information is found, determining a corresponding access way of the mobile terminal based on the access point information, wherein the access way includes Voice over Long Term Evolution (VoLTE) and Voice over Wireless-Fidelity (VoWiFi);

in response to that the access point information is not found, sending a public data network (PDN) request to create a connection by using a VoLTE mode;

determining a connection way of the mobile terminal based on a result of the connection;

binding the access identifier and the access type that correspond to the determined connection way to the parameter information and storing the same in the database to update the database;

sending the updated database to a vendor server corresponding to the mobile terminal such that the vendor server updates a factory-configured configuration file based on the updated database, and the updated configuration file is delivered to all the corresponding mobile terminals in a form of a package of updates, so as to update the configuration file for every mobile terminal.

Before obtaining the parameter information of the SIM card in response to inserting the SIM card into the mobile terminal, the method includes:

pre-storing a configuration file in the mobile terminal for the access ways, wherein the configuration file includes the parameter information of the SIM card, the access point type and the access identifier.

Before obtaining the parameter information of the SIM card in response to inserting the SIM card into the mobile terminal, the method includes:

in response to that the mobile terminal starts up, obtaining the pre-stored configuration file for the access ways and loading the configuration file into the preset database.

Determining the connection way of the mobile terminal based on a result of the connection includes:

determining the VoLTE mode as the connection way of the mobile terminal if the connection is created.

Binding the access identifier and the access type that correspond to the determined connection way to the parameter information and storing the same in the database to update the database includes:

binding the access identifier and the access type that correspond to the VoLTE mode to the parameter information and storing the same in the database to update the database.

Determining the connection way of the mobile terminal based on a result of the connection includes:

determining a VoWiFi mode as the connection way of the mobile terminal if the connection is not created, Binding the access identifier and the access type that correspond to the determined connection way to the parameter information and storing the same in the database to update the database includes:

binding the access identifier and the access type that correspond to the VoWiFi mode to the parameter information and storing the same in the database to update the database.

After determining the corresponding access way of the mobile terminal based on the access point information, wherein the access way includes VoLTE and VoWiFi, the method further includes:

utilizing the access way to send a public data network (PDN) connection request for using a SIM service by the access way.

It should be noted that the above embodiments are only intended to illustrate the technical solutions of the present invention and are not to be construed as a limitation. Despite that the present invention has been detailedly described with above embodiments, one of ordinary skill in the art should understood that modifications may be made to the technical solutions described in the foregoing embodiments, or equivalent replacements may be made to some of the technical features thereof; and these modifications or replacements do not make the essence of corresponding technical solutions depart from spirit and scope of technical solution of the embodiments of the present invention.

What is claimed is:

1. A method for determining an access way of a mobile terminal, comprising:
   obtaining parameter information of a subscriber identity module (SIM) card in response to inserting the SIM card into the mobile terminal;
   based on the parameter information, searching a preset database for access point information corresponding to the parameter information, wherein the access point information comprises an access point type and an access identifier; and
   in response to that the access point information is found, determining a corresponding access way of the mobile terminal based on the access point information, wherein the access way comprises Voice over Long Term Evolution (VoLTE) and Voice over Wireless-Fidelity (VoWiFi),
   wherein before obtaining the parameter information of the SIM card in response to inserting the SIM card into the mobile terminal, the method comprises:
   pre-storing a configuration file in the mobile terminal for the access ways, wherein the configuration file comprises the parameter information of the SIM card, the access point type and the access identifier,
   wherein the method further comprises:
   in response to that the access point information is not found, sending a public data network (PDN) request to create a connection by using a VoLTE mode;
   determining the VoLTE mode as a connection way of the mobile terminal if the connection is created; and
   determining a VoWiFi mode as the connection way of the mobile terminal if the connection is not created.

2. The method according to claim 1, wherein before obtaining the parameter information of the SIM card in response to inserting the SIM card into the mobile terminal, the method comprises:
   in response to that the mobile terminal starts up, obtaining the pre-stored configuration file for the access ways and loading the configuration file into the preset database.

3. The method according to claim 1, wherein after determining the VoLTE mode as the connection way of the mobile terminal if the connection is created, the method further comprises:
   binding the access identifier and the access point type that correspond to the VoLTE mode to the parameter information and storing the same in the database to update the database.

4. The method according to claim 3, wherein after storing in the database to update the database, the method further comprises:
   updating the configuration file based on the updated database.

5. The method according to claim 1, wherein after determining the VoWiFi mode as the connection way of the mobile terminal if the connection is not created, the method further comprises:
   binding the access identifier and the access point type that correspond to the VoWiFi mode to the parameter information and storing the same in the database to update the database.

6. The method according to claim 1, wherein after determining the corresponding access way of the mobile terminal based on the access point information, wherein the access way comprises VoLTE and VoWiFi, the method further comprises:
   utilizing the access way to send a public data network (PDN) connection request for using a SIM service by the access way.

7. A non-transitory storage medium, storing a plurality of instructions, which are loaded by a processor to execute the steps of:
   obtaining parameter information of a subscriber identity module (SIM) card in response to inserting the SIM card into a mobile terminal;
   based on the parameter information, searching a preset database for access point information corresponding to the parameter information, wherein the access point information comprises an access point type and an access identifier; and
   in response to that the access point information is found, determining a corresponding access way of the mobile terminal based on the access point information, wherein the access way comprises Voice over Long Term Evolution (VoLTE) and Voice over Wireless-Fidelity (VoWiFi),
   wherein before obtaining the parameter information of the SIM card in response to inserting the SIM card into the mobile terminal, the method comprises:
   pre-storing a configuration file in the mobile terminal for the access ways, wherein the configuration file comprises the parameter information of the SIM card, the access point type and the access identifier,
   wherein after searching a preset database for access point information corresponding to the parameter information based on the parameter information, wherein the access point information comprises an access point type and an access identifier, the method further comprises:
   in response to that the access point information is not found, sending a public data network (PDN) request to create a connection by using a VoLTE mode;
   determining the VoLTE mode as a connection way of the mobile terminal if the connection is created; and
   determining a VoWiFi mode as the connection way of the mobile terminal if the connection is not created.

8. The non-transitory storage medium according to claim 7, wherein before obtaining the parameter information of the SIM card in response to inserting the SIM card into the mobile terminal, the method comprises:
   in response to that the mobile terminal starts up, obtaining the pre-stored configuration file for the access ways and loading the configuration file into the preset database.

9. The non-transitory storage medium according to claim 7, wherein after determining the VoLTE mode as the connection way of the mobile terminal if the connection is created, the method further comprises:
binding the access identifier and the access point type that correspond to the VoLTE mode to the parameter information and storing the same in the database to update the database.

10. The non-transitory storage medium according to claim 7, wherein after determining the VoWiFi mode as the connection way of the mobile terminal if the connection is not created, the method further comprises:
binding the access identifier and the access point type that correspond to the VoWiFi mode to the parameter information and storing the same in the database to update the database.

11. A mobile terminal, comprising:
a processor, for implementing instructions; and
a storage device, for storing a plurality of the instructions, which are loaded by their processor to execute the steps of:
obtaining parameter information of a subscriber identity module (SIM) card in response to inserting the SIM card into a mobile terminal;
based on the parameter information, searching a preset database for access point information corresponding to the parameter information, wherein the access point information comprises an access point type and an access identifier;
in response to that the access point information is found, determining a corresponding access way of the mobile terminal based on the access point information, wherein the access way comprises Voice over Long Term Evolution (VoLTE) and Voice over Wireless-Fidelity (VoWiFi);
in response to that the access point information is not found, sending a public data network (PDN) request to create a connection by using a VoLTE mode;
determining a connection way of the mobile terminal based on a result of the connection;
binding the access identifier and the access point type that correspond to the determined connection way to the parameter information and storing the same in the database to update the database; and
sending the updated database to a vendor server corresponding to the mobile terminal such that the vendor server updates a factory-configured configuration file based on the updated database, and the updated configuration file is delivered to all the corresponding mobile terminals in a form of a package of updates, so as to update the configuration file for every mobile terminal.

12. The mobile terminal according to claim 11, wherein before obtaining the parameter information of the SIM card in response to inserting the SIM card into the mobile terminal, the method comprises:
pre-storing a configuration file in the mobile terminal for the access ways, wherein the configuration file comprises the parameter information of the SIM card, the access point type and the access identifier.

13. The mobile terminal according to claim 12, wherein before obtaining the parameter information of the SIM card in response to inserting the SIM card into the mobile terminal, the method comprises:
in response to that the mobile terminal starts up, obtaining the pre-stored configuration file for the access ways and loading the configuration file into the preset database.

14. The mobile terminal according to claim 11, wherein determining the connection way of the mobile terminal based on the result of the connection comprises:
determining the VoLTE mode as the connection way of the mobile terminal if the connection is created,
wherein binding the access identifier and the access point type that correspond to the determined connection way to the parameter information and storing the same in the database to update the database comprises:
binding the access identifier and the access point type that correspond to the VoLTE mode to the parameter information and storing the same in the database to update the database.

15. The mobile terminal according to claim 11, wherein determining the connection way of the mobile terminal based on the result of the connection comprises:
determining a VoWiFi mode as the connection way of the mobile terminal if the connection is not created,
wherein binding the access identifier and the access point type that correspond to the determined connection way to the parameter information and storing the same in the database to update the database comprises:
binding the access identifier and the access point type that correspond to the VoWiFi mode to the parameter information and storing the same in the database to update the database.

16. The mobile terminal according to claim 11, wherein after determining the corresponding access way of the mobile terminal based on the access point information, wherein the access way comprises VoLTE and VoWiFi, the method further comprises:
utilizing the access way to send a public data network (PDN) connection request for using a SIM service by the access way.

* * * * *